US012166254B2

(12) United States Patent
Li et al.

(10) Patent No.: US 12,166,254 B2
(45) Date of Patent: Dec. 10, 2024

(54) PHASE SHIFTER WITH AT LEAST ONE PHASE SHIFTING UNIT HAVING FILM BRIDGES AND CONNECTION ELECTRODES FOR CONNECTING ADJACENT SIGNAL LINE SEGMENTS

(71) Applicants: Beijing BOE Technology Development Co., Ltd., Beijing (CN); BOE TECHNOLOGY GROUP CO., LTD., Beijing (CN)

(72) Inventors: Chunxin Li, Beijing (CN); Jingwen Guo, Beijing (CN); Qianhong Wu, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 541 days.

(21) Appl. No.: 17/490,592

(22) Filed: Sep. 30, 2021

(65) Prior Publication Data

US 2022/0238974 A1 Jul. 28, 2022

(30) Foreign Application Priority Data

Jan. 26, 2021 (CN) ........................ 202120211716.1

(51) Int. Cl.
*H01P 1/18* (2006.01)
*H01P 1/10* (2006.01)

(52) U.S. Cl.
CPC ................ *H01P 1/184* (2013.01); *H01P 1/10* (2013.01); *H01P 1/18* (2013.01)

(58) Field of Classification Search
CPC .. H01P 1/18; H01P 1/184; H01P 1/185; H01P 1/10
USPC .................................................. 333/139, 161
See application file for complete search history.

(56) References Cited

U.S. PATENT DOCUMENTS 3,796,976 A * 3/1974 Heng et al. ............... H01P 5/04 333/262
6,281,838 B1 * 8/2001 Hong ....................... H01G 5/18 333/139
6,373,007 B1 * 4/2002 Calcatera et al. . H01H 59/0009 200/181

* cited by examiner

*Primary Examiner* — Benny T Lee
(74) *Attorney, Agent, or Firm* — HOUTTEMAN LAW LLC

(57) ABSTRACT

A phase shifter includes a substrate, a transmission line on the substrate and extending in a first direction, and first and second reference electrodes respectively on both sides of an extension direction of the transmission line. The transmission line includes signal line segments, any adjacent two of which have a gap therebetween to define a connection region. The phase shifter further includes at least one phase shifting unit each including: a film bridge extending in the first direction, a connection electrode extending in a second direction, and an interlayer insulating layer on a side of the connection electrode distal to the substrate. Both ends of the connection electrode are respectively connected with the first and second reference electrodes, and an orthogonal projection of the connection electrode on the substrate is in the connection region. Both ends of the film bridge are respectively connected with adjacent two signal line segments.

20 Claims, 3 Drawing Sheets

PHASE SHIFTER WITH AT LEAST ONE PHASE SHIFTING UNIT HAVING FILM BRIDGES AND CONNECTION ELECTRODES FOR CONNECTING ADJACENT SIGNAL LINE SEGMENTS

CROSS REFERENCE TO RELATED APPLICATIONS

The present application claims priority to Chinese patent application No. 202120211716.1, filed on Jan. 26, 2021, the content of which is incorporated herein by reference in its entirety.

TECHNICAL FIELD

The present disclosure relates to the field of wireless communication technology, and in particular to a phase shifter and an antenna device.

BACKGROUND

A phase shifter is an essential key component in communication applications and radar applications. Existing phase shifters mainly include a ferrite phase shifter, a semiconductor phase shifter, a Micro-Electro-Mechanical System (MEMS) phase shifter and the like, and the MEMS phase shifter has significant advantages in the aspects of insertion loss, power consumption, volume, cost and the like, such that the MEMS phase shifter attracts wide attention in the fields of radio communication, microwave technology and the like.

SUMMARY OF THE INVENTION

Some embodiments of the present disclosure provide a phase shifter and an antenna device.

A first aspect of the present disclosure provides a phase shifter, which includes:

a substrate, a transmission line on the substrate and extending in a first direction, and a first reference electrode and a second reference electrode respectively on both sides of the transmission line and extending in the first direction, wherein the transmission line includes a plurality of signal line segments which are arranged side by side and spaced apart from each other in the first direction, each of the plurality of signal line segments extends in the first direction, and a connection region is defined by a respective gap between any adjacent two of the plurality of signal line segments;

the phase shifter further includes at least one phase shifting unit, each phase shifting unit includes: a respective film bridge extending in the first direction, a respective connection electrode extending in a second direction, and an interlayer insulating layer on a side of the respective connection electrode distal to the substrate;

both ends of the respective connection electrode are connected with the first reference electrode and the second reference electrode, respectively, and an orthogonal projection of the respective connection electrode on the substrate is in the connection region;

both ends of the respective film bridge are respectively connected with adjacent two signal line segments that define the connection region; and the respective connection electrode in each phase shifting unit is in a space formed by the respective film bridge and the substrate.

In an embodiment, the at least one phase shifting unit is a plurality of phase shifting units, and a distance between the respective film bridge and the respective connection electrode in each of the plurality of phase shifting units is a constant.

In an embodiment, the at least one phase shifting unit is a plurality of phase shifting units, and distances between respective film bridges and respective connection electrodes of at least some of the plurality of phase shifting units are different from each other.

In an embodiment, the distances between the respective film bridges and the respective connection electrodes in the plurality of phase shifting units are increased monotonically or decreased monotonically in the first direction.

In an embodiment, the at least one phase shifting unit is a plurality of phase shifting units, and overlapping areas of orthogonal projections of respective film bridges on the substrate and orthogonal projections of respective connection electrodes on the substrate in at least some of the plurality of phase shifting units are different from each other.

In an embodiment, the overlapping areas of the orthogonal projections of the respective film bridges on the substrate and the orthogonal projections of the respective connection electrodes on the substrate in the plurality of phase shifting units are decreased monotonically in the first direction.

In an embodiment, the distances between the respective film bridges and the respective connection electrodes in the plurality of phase shifting units are increased monotonically in the first direction.

In an embodiment, the overlapping areas of the orthogonal projections of the respective film bridges on the substrate and the orthogonal projections of the respective connection electrodes on the substrate in the plurality of phase shifting units are different from each other, dimensions in the second direction of the respective film bridges in the plurality of phase shifting units are equal to each other, and dimensions in the first direction of the respective connection electrodes in the plurality of phase shifting units are different from each other.

In an embodiment, the respective film bridge of the at least one phase shifting unit has a same dimension in the second direction, and the respective connection electrode of the at least one phase shifting unit has a dimension in the first direction that is increased monotonically or decreased monotonically.

In an embodiment, the first reference electrode, the second reference electrode, the respective connection electrode, and the transmission line are in a same layer and include a same material.

In an embodiment, the first reference electrode, the second reference electrode and the respective connection electrode have a one-piece structure.

In an embodiment, the respective film bridge includes a material of an aluminum-silicon alloy.

In an embodiment, each of the plurality of signal line segments includes a material of copper or gold.

In an embodiment, a respective distance between any adjacent two of the plurality of signal line segments is less than a distance between the first reference electrode and the second reference electrode.

In an embodiment, the respective film bridge and the interlayer insulating layer has a gap therebetween.

In an embodiment, the first reference electrode and the second reference electrode are spaced apart from the transmission line, respectively.

In an embodiment, the first reference electrode and the second reference electrode are parallel to the transmission line, respectively.

In an embodiment, the first direction and the second direction are perpendicular to each other.

In an embodiment, the interlayer insulating layer includes a material of silicon nitride or polyimide.

A second aspect of the present disclosure provides an antenna device, which includes the phase shifter according to any one of the foregoing embodiments of the first aspect of the present disclosure.

DETAILED DESCRIPTION OF THE INVENTION

To enable one of ordinary skill in the art to better understand technical solutions of the present disclosure, the present disclosure will be further described in detail below with reference to the accompanying drawings and exemplary embodiments, where like features are denoted by the same reference labels throughout the detail description of the drawings.

Unless defined otherwise, technical or scientific terms used herein should have the same meaning as commonly understood by one of ordinary skill in the art to which the present disclosure belongs. The terms of "first", "second", and the like used herein are not intended to indicate any order, quantity, or importance, but rather are used for distinguishing one element from another. Further, the terms "a", "an", "the", or the like used herein do not denote a limitation of quantity, but rather denote the presence of at least one element. The term of "comprising", "including", or the like, means that the element or item preceding the term contains the element or item listed after the term and its equivalent, but does not exclude the presence of other elements or items. The term "connected" or "coupled" is not limited to physical or mechanical connections, but may include electrical connections, whether direct or indirect connections. The terms "upper", "lower", "left", "right", and the like are used only to indicate relative positional relationships, and when the absolute position of an object being described in is changed, the relative positional relationships may also be changed accordingly.

The inventors of the present inventive concept have found that, each switch (e.g., each metal respective film bridge) of a related MEMS phase shifter requires to be connected to a corresponding pad by one bias line, and the phase shifter is controlled by a plurality of bias voltages, resulting in a large number of bias lines and a large number of pins of a chip. In addition, a metal respective film bridge of the related MEMS phase shifter spans between two ground lines of a coplanar waveguide and is suspended (or hung) above a signal line of the coplanar waveguide, and in order to ensure that a transmission line has a proper characteristic impedance, a distance by which the metal respective film bridge spans between two ground lines is usually large, and is generally about hundreds of microns. A large length of the metal respective film bridge easily causes the metal respective film bridge to collapse, which is not beneficial to improving a yield rate of MEMS phase shifters.

Figure 1:
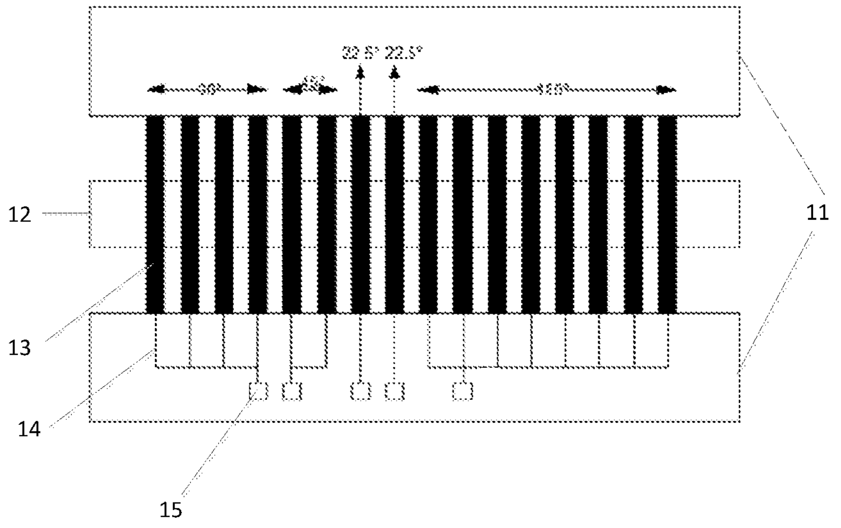
FIG. 1 is a schematic diagram (e.g., a top view) showing a structure of a phase shifter according to an embodiment of the present disclosure.

FIG. 1 is a schematic diagram showing a structure of a phase shifter according to an embodiment of the present disclosure. As shown in FIG. 1, the phase shifter includes two ground lines 11, a signal line 12, and a plurality of phase shifting units, which are formed on a substrate (which is similar to a substrate 21 shown in FIG. 2). The two ground lines 11 are arranged to be spaced apart from and in parallel with the signal line 12, and the two ground lines 11 are symmetrically arranged on two sides of the signal line 12, such that the two ground lines 11 and the signal line 12 together form a transmission line. Each phase shifting unit includes at least one metal respective film bridge 13, and each metal respective film bridge 13 spans between the two ground lines 11 of a coplanar waveguide and is suspended above the signal line 12 thereof. Each metal respective film bridge 13 is connected to a corresponding pad 15 through a bias line (e.g., a wire for receiving a bias voltage) 14. During a phase shift, a chip (e.g., a driver chip) inputs a bias signal (e.g., a bias voltage) to the pad 15, and the bias line 14 connected to the pad 15 inputs the bias signal to the corresponding metal respective film bridge 13. Accordingly, a bias voltage is formed between the metal respective film bridge 13, which receives the bias signal, and the signal line 12. Since a bridge floor portion of the metal respective film bridge 13 has a certain elasticity, the bridge floor portion of the metal respective film bridge 13 receiving the bias signal moves in a direction perpendicular to the signal line 12 under the bias voltage. That is, by inputting a direct current (DC) bias voltage to the metal respective film bridge 13, a distance between the bridge floor portion of the metal respective film bridge 13 and the signal line 12 can be changed. Thus, a capacitance of a capacitor formed by the bridge floor portion of the metal respective film bridge 13 and the signal line 12 can be changed, and parameters of the transmission line can be changed, thereby realizing a phase shifting function. FIG. 1 exemplarily shows five phase shifting units and five pads 15, and the five phase shifting units are in one-to-one correspondence with the five pads 15. The five phase shifting units of the phase shifter can realize phase shifting amounts of 22.5°, 22.5°, 45°, 90° and 180°, respectively, as shown in FIG. 1.

However, the inventors of the present inventive concept have found that, the number of bias lines 14 of the phase shifter shown in FIG. 1 is large because each metal respective film bridge 13 in each phase shifting unit of the phase shifter shown in FIG. 1 needs to be connected to the corresponding pad 15 through one bias line 14. In addition, since each metal respective film bridge 13 spans between the two ground lines 11 of the coplanar waveguide and is suspended above the signal line 12 thereof, the distance by which each metal respective film bridge 13 spans between the two ground lines 11 is generally large. Therefore, during a manufacturing process of each metal respective film bridge 13, the metal respective film bridge 13, which is long, is easy to collapse, thereby reducing the yield rate of phase shifters.

To solve at least one of the above technical problems, other embodiments of the present disclosure provide a phase shifter and an antenna device. The phase shifter and the antenna device according to each of the other exemplary embodiments of the present disclosure will be described in further detail below with reference to the accompanying drawings.

Figure 2:
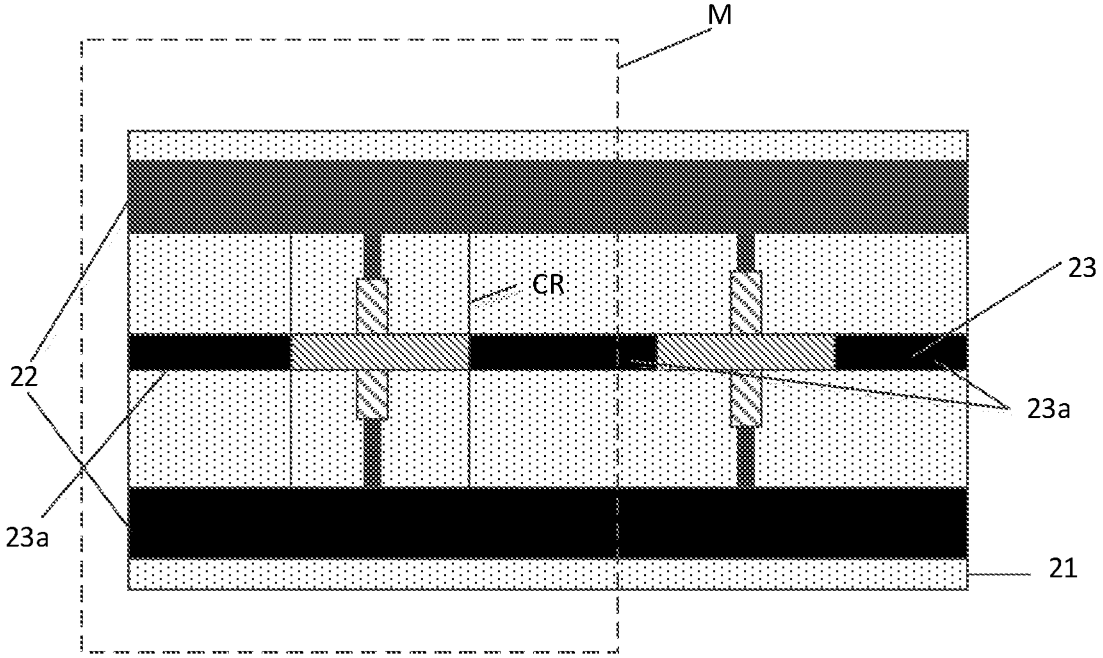
FIG. 2 is a schematic diagram (e.g., a top view) showing a structure of a phase shifter according to an embodiment of the present disclosure.

In a first aspect, FIG. 2 is a schematic diagram showing a structure of a phase shifter according to an embodiment of the present disclosure. As shown in FIG. 2, the phase shifter includes a substrate 21, and a first reference electrode (e.g., a first ground line 22), a second reference electrode (e.g., a second ground line 22), a transmission line (e.g., a signal line 23), and at least one phase shifting unit M (e.g., two phase shifting units M are exemplarily shown in FIG. 2, but the present disclosure is not limited thereto), which are disposed on the substrate 21. In the present embodiment, further description will be made by taking an example in which the first reference electrode and the second reference electrode are both the ground lines 22, and the transmission line is the signal line 23.

Figure 3:
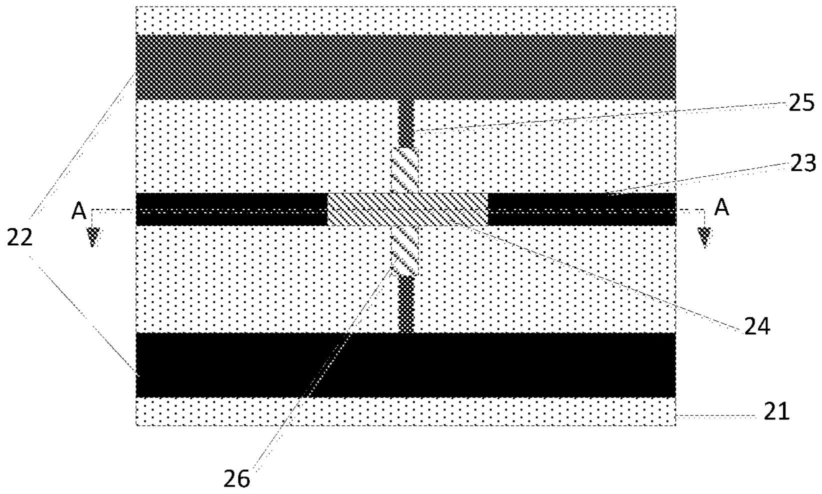
FIG. 3 is a schematic diagram showing a structure of a phase shifting unit of the phase shifter shown in FIG. 2.
Figure 4:
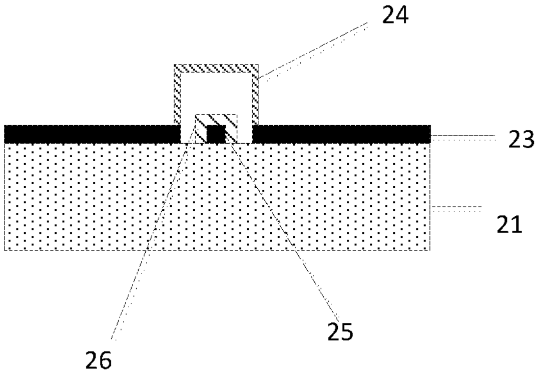
FIG. 4 is a schematic cross-sectional view showing a structure of the phase shifter shown in FIG. 3 taken along a line A-A.

A plurality of phase shifting units in the phase shifter may have a same structure and a same function. The following description will be given by taking only one of the plurality of phase shifting units of the phase shifter as an example. FIG. 3 is a schematic diagram showing a structure of one phase shifting unit M in the phase shifter shown in FIG. 2, and FIG. 4 is a schematic cross-sectional view showing a structure of the phase shifting unit of the phase shifter shown in FIG. 3 taken along a line A-A. As shown in FIGS. 3 and 4, in the present embodiment, the two ground lines 22 (FIG. 3) and signal line 23 that are formed on the substrate 21 together form a coplanar waveguide (CPW) transmission line. For example, the signal line 23 is disposed on the substrate 21 and extends in a first direction (e.g., the horizontal direction in FIG. 2 or 3), and the two ground lines 22 are respectively disposed on the substrate 21, on both sides of an extension direction (i.e., a lengthwise direction) of the signal line 23, and spaced apart from the signal line 23. The signal line 23 includes a plurality of signal line segments 23*a* (FIG. 2) arranged side by side and spaced apart from each other along the first direction. Each of the plurality of signal line segments 23*a* (FIG. 2) extends along the first direction, and a connection region CR (FIG. 2) is defined by a gap between any adjacent two of the plurality of signal line segments 23*a* (FIG. 2). With continued reference to FIGS. 2, 3, and 4, each phase shifting unit M (FIG. 2) includes a respective film bridge 24 (FIGS. 3 and 4) extending in the first direction, a respective connection electrode 25 (FIGS. 3 and 4) extending in a second direction (e.g., the vertical direction in FIG. 2 or 3), and an interlayer insulating layer 26 (FIGS. 3 and 4) disposed on a side of the respective connection electrode 25 distal to the substrate 21 (in other words, disposed between the respective connection electrode 25 and the respective film bridge 24). Both ends of the respective connection electrode 25 are connected to the two ground lines 22, respectively, and an orthogonal projection of the respective connection electrode 25 on the substrate 21 is located within the connection region CR (FIG. 2). Both ends of the respective film bridge 24 are connected to the adjacent two signal line segments 23*a* (FIG. 2) defining the connection region CR (FIG. 2), respectively. The respective connection electrode 25 in each phase shifting unit M (FIG. 2) is located in a space formed by the respective film bridge 24 and the substrate 21. Since both ends of the respective connection electrode 25 are connected to the two ground lines 22, respectively, a potential on the respective connection electrode 25 is the same as a potential on the ground lines 22. It should be noted that the phase shifter according to an embodiment of the present disclosure may be, for example, a Micro-Electro-Mechanical System (MEMS) phase shifter.

In the present embodiment, a material of the respective film bridge 24 may include an aluminum-silicon alloy, and a material of the interlayer insulating layer 26 may include silicon nitride or polyimide. Further, a material of the signal line 23 may include copper or gold.

It should be noted that, the phase shifter according to the present embodiment may further include a plurality of phase shifting units, each of which is shown in FIG. 3, and since the plurality of the phase shifting units have a same structure, detailed description thereof is not repeated here.

In the present embodiment, when the phase shifter disclosed herein is to operate, only a bias signal needs to be transmitted across the signal line 23 and the ground lines 22, to generate a bias voltage (i.e., a driving voltage for the metal respective film bridge 24) between the ground lines 22 and the signal line 23, so as to change a height of the metal respective film bridge 24 in a direction perpendicular to the substrate 21, thereby changing a capacitance between the metal respective film bridge 24 and the respective connection electrode 25. In this way, a distribution of capacitance of the coplanar waveguide transmission line is changed to thereby make the coplanar waveguide transmission line a slow wave system, thereby achieving the purpose of phase delay. Compared with the transmission of the bias signal by using a plurality of bias lines as shown in FIG. 1, the phase shifter shown in each of FIGS. 2 to 4 transmit the bias signal through only the signal line 23, and thus the number of transmission paths (e.g., the bias lines 14 as shown in FIG. 1) of the bias signal are greatly reduced. Further, the metal respective film bridge 24 spans (or bridges) between adjacent two signal line segments 23*a* spaced apart from each other, and since the connection region CR defined by the adjacent two signal line segments 23*a* has a dimension in the first direction much smaller than a distance between the two ground lines 22 (in other words, the dimension of the connection region CR in the first direction is smaller than the distance between the two ground lines 22 in the second direction, or a distance between the adjacent two signal line segments 23*a* is smaller than the distance between the two ground lines 22), the metal respective film bridge 24 spans (or bridges) between the adjacent two signal line segments 23*a* by a small distance. Therefore, during a formation process of the metal respective film bridge 24, the metal respective film bridge 24 is not easy to collapse, thereby improving the yield rate of phase shifters.

In some embodiments, the phase shifter may include a plurality of phase shifting units, and distances between the metal respective film bridges 24 and the respective connection electrodes 25 in the plurality of phase shifting units are equal to each other (in other words, a distance between the metal respective film bridge 24 and the respective connection electrode 25 in each phase shifting unit is a constant). In the present embodiment, the driving voltage Vp for the metal respective film bridge 24 may be calculated by the following formula:

$$Vp=\sqrt{\frac{2k}{\varepsilon owW}g^2(go-g)},$$

where k is an elastic coefficient of the metal respective film bridge 24, co is the vacuum dielectric constant, w is a width of the metal respective film bridge 24 (i.e., a dimension of the metal respective film bridge 24 in the second direction in FIG. 2 or FIG. 3), W is a width of the respective connection electrode 25 (i.e., a dimension of the respective connection electrode 25 in the first direction in FIG. 2 or 3), w*W is an overlapping area between the metal respective film bridge 24 and the respective connection electrode 25, go is an initial distance between the metal respective film bridge 24 and the respective connection electrodes 25, and g is an actual distance (i.e., a current distance) between the metal respective film bridge 24 and the respective connection electrode 25. It can be seen from the formula of the driving voltage Vp for the metal respective film bridge 24 that, the driving voltage Vp for the metal respective film bridge 24 is related to the distance between the metal respective film bridge 24 and the respective connection electrode 25. In the present embodiment, by setting the distances between the metal respective film bridges 24 and the respective connection electrodes 25 in the plurality of phase shifting units to be equal to each other, the metal respective film bridges 24 of the plurality of phase shifting units may have a same driving voltage. Therefore, during the operation of the phase shifter, the operation of the plurality of phase shifting units can be controlled at the same time by inputting a same bias signal to the signal line 23, thereby reducing the number of the transmission paths of the bias signal.

In some embodiments, the phase shifter may include a plurality of phase shifting units, and the metal respective film bridges 24 and the respective connection electrodes 25 in at least some of the plurality of phase shifting units may have different distances therebetween, respectively. In the present embodiment, driving voltages for the metal respective film bridges 24 in the phase shifting units may be different from each other by setting the distances between the metal respective film bridges 24 and the respective connection electrodes 25 in the phase shifting units to be unequal to each other. Therefore, during the operation of the phase shifter, operating states of the respective phase shifting units may be controlled by sequentially providing the signal line 23 with bias signals (e.g., bias voltages) of different magnitudes, thereby achieving different phase shifting amounts.

Figure 5:
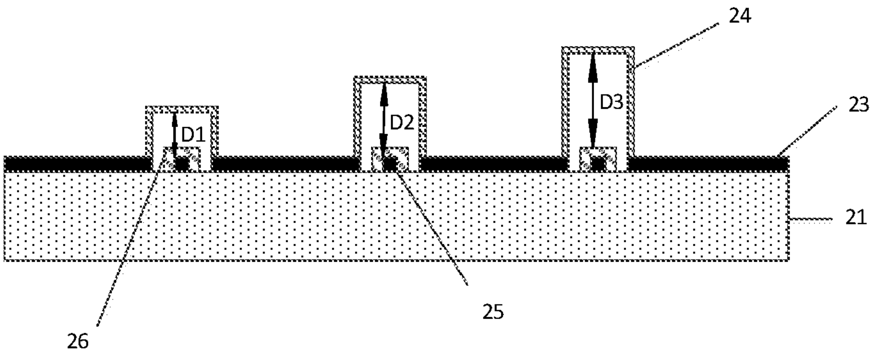
FIG. 5 is a schematic cross-sectional view showing a structure of another phase shifter according to an embodiment of the present disclosure.

In some embodiments, the phase shifter may include a plurality of phase shifting units. In the first direction, the distances between the metal respective film bridges 24 and the respective connection electrodes 25 in the plurality of phase shifting units are increased or decreased monotonically. In the present embodiment, an example in which the distances between the metal respective film bridges 24 and the respective connection electrodes 25 in the plurality of phase shifting units are increased monotonically is taken as an example for description. FIG. 5 is a schematic cross-sectional diagram showing a structure of another phase shifter according to an embodiment of the present disclosure, and the present embodiment adopts a three-bit phase shifter (i.e., a phase shifter including three phase shifting units) as an example. As shown in FIG. 5, the phase shifter according to the present embodiment includes three phase shifting units. In the three phase shifting units of the phase shifter according to the present embodiment, the distances D1, D2 and D3 between the metal respective film bridges 24 and the respective connection electrodes 25 are increased in sequence (i.e., D1<D2<D3, as shown in FIG. 5). Other structures of each phase shifting unit shown in FIG. 5 are the same as those of the phase shifting unit shown in each of FIGS. 2, 3 and 4. As described above, the driving voltage Vp for the metal respective film bridge 24 may be calculated by the following formula:

$$Vp=\sqrt{\frac{2k}{\varepsilon owW}g^2(go-g)},$$

where k is the elastic coefficient of the metal respective film bridge 24, 80 is the vacuum dielectric constant, w is the width of the metal respective film bridge 24, W is the width of the respective connection electrode 25, w*W is the overlapping area between the metal respective film bridge 24 and the respective connection electrode 25, go is the initial distance between the metal respective film bridge 24 and the respective connection electrodes 25, and g is the actual distance between the metal respective film bridge 24 and the respective connection electrode 25. It can be seen from the formula of the driving voltage Vp for the metal respective film bridge 24 that, the driving voltage Vp for the metal respective film bridge 24 is in direct proportion to the distance between the metal respective film bridge 24 and the respective connection electrode 25. That is, the greater the distance between the metal respective film bridge 24 and the respective connection electrode 25 is, the higher the driving voltage is. In the present embodiment, the distances between the metal respective film bridges 24 and the respective connection electrodes 25 in different phase shifting units are set to be increased sequentially, such that the driving voltages for the metal respective film bridges 24 can be gradually increased. Therefore, during the operation of the phase shifter, as an amplitude of a bias signal input to the signal line 23 is gradually increased, the three phase shifting units are turned off (e.g., the distances between the metal respective film bridges 24 and the respective connection electrodes 25 in the three phase shifting units take their minimum values) in sequence, thereby achieving different phase shifting amounts. In the present embodiment, the phase shifter provided by the present disclosure can obtain different phase shifting amounts only by adjusting the magnitude of an amplitude of the bias signal on the signal line. It should be noted that, a case where the distances between the metal respective film bridges and the respective connection electrodes in the phase shifting units are decreased monotonically is contrary to the above case where the distances between the metal respective film bridges and the respective connection electrodes in the phase shifting units are increased monotonically, detailed description thereof is thus omitted.

In some embodiments, the phase shifter may include a plurality of phase shifting units, and overlapping areas of orthogonal projections of the metal respective film bridges 24 on the substrate 21 and orthogonal projections of the respective connection electrodes 25 on the substrate 21 in at least some of the plurality of phase shifting units are different from each other. In the present embodiment, the driving voltage Vp for the metal respective film bridge 24 is related to the overlapping area (i.e., w*W as described above) of the orthogonal projection of the metal respective film bridge 24 on the substrate 21 and the orthogonal projection of the respective connection electrode 25 on the substrate 21, according to the formula of the driving voltage Vp for the metal respective film bridge 24. In the present embodiment, by setting the overlapping areas of the orthogonal projections of the metal respective film bridges 24 on the substrate 21 and the orthogonal projections of the respective connection electrodes 25 on the substrate 21 in the phase shifting units to be different from each other, the driving voltages (e.g., the magnitudes of the amplitudes of the driving voltages) for the metal respective film bridges 24 in the phase shifting units can be different from each other, for achieving different phase shifting amounts. Therefore, by adjusting the magnitude of the amplitude of the bias signal input to the signal line 23 during the operation of the phase shifter, the operation of the plurality of phase shifting units can be controlled simultaneously, thereby reducing the number of the transmission paths of the bias signal.

Figure 6:
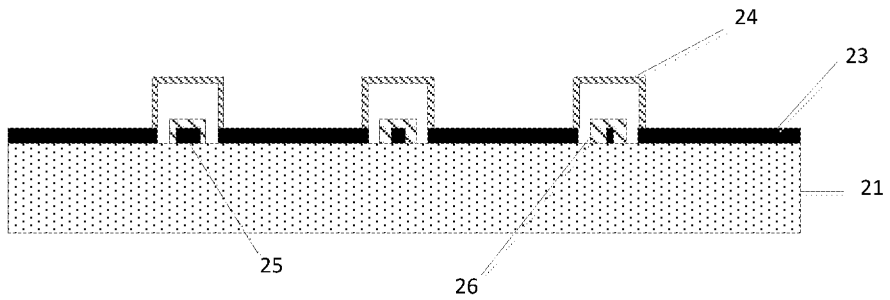
FIG. 6 is a schematic cross-sectional view showing a structure of another phase shifter according to an embodiment of the present disclosure.

In some embodiments, the phase shifter may include a plurality of phase shifting units, and the metal respective film bridges 24 thereof have a same dimension in the second direction. Further, the respective connection electrodes 25 thereof have dimensions increased monotonically or decreased monotonically in the first direction, and thus the overlapping areas of the metal respective film bridges 24 and the respective connection electrodes 25 are increased monotonically or decreased monotonically. The embodiment of FIG. 6 is explained by taking an example in which the dimensions of the respective connection electrodes 25 are decreased monotonically. FIG. 6 is a schematic cross-sectional view showing a structure of another phase shifter according to an embodiment of the present disclosure, which is illustrated by taking a three-bit phase shifter as an example. As shown in FIG. 6, the phase shifter according to the present embodiment includes three phase shifting units. The three phase shifting units in the present embodiment have a structure in which only the overlapping areas of the metal respective film bridges 24 and the respective connection electrodes 25 are decreased sequentially, while other configurations of each phase shifting unit shown in FIG. 6 are the same as those of the phase shifting unit shown in each of FIGS. 2, 3, and 4. As described above, the driving voltage Vp for the metal respective film bridge 24 may be calculated by the following formula:

$$Vp = \sqrt{\frac{2k}{\varepsilon owW} g^2 (go - g)},$$

where k is the elastic coefficient of the metal respective film bridge 24, 80 is the vacuum dielectric constant, w is the width of the metal respective film bridge 24, W is the width of the respective connection electrode 25, w*W is the overlapping area between the metal respective film bridge 24 and the respective connection electrode 25, go is the initial distance between the metal respective film bridge 24 and the respective connection electrodes 25, and g is the actual distance between the metal respective film bridge 24 and the respective connection electrode 25. It can be seen from the formula of the driving voltage Vp for the metal respective film bridge 24 that, the driving voltage Vp for the metal respective film bridge 24 is in reverse proportion to the overlapping area w*W between the metal respective film bridge 24 and the respective connection electrode 25. That is, the smaller the overlapping area w*W between the metal respective film bridge 24 and the respective connection electrode 25 is, the larger the required driving voltage is. In the present embodiment, the overlapping areas between the metal respective film bridges 24 and the respective connection electrodes 25 in different phase shifting units are set to be decreased sequentially, such that the driving voltages for the metal respective film bridges 24 can be increased sequentially. Therefore, during the operation of the phase shifter, as the bias signal input to the signal line is increased sequentially, the three phase shifting units are turned off in sequence, thereby achieving different phase shifting amounts. In the present embodiment, the phase shifter according to the present disclosure can achieve different phase shifting amounts by only adjusting the magnitude of the amplitude of the bias signal on the signal line. It should be noted that, a case where the dimensions of the respective connection electrodes 25 are increased monotonically is contrary to the above case where the dimensions of the respective connection electrodes 25 are decreased monotonically, and thus detailed description thereof is omitted herein.

Figure 7:
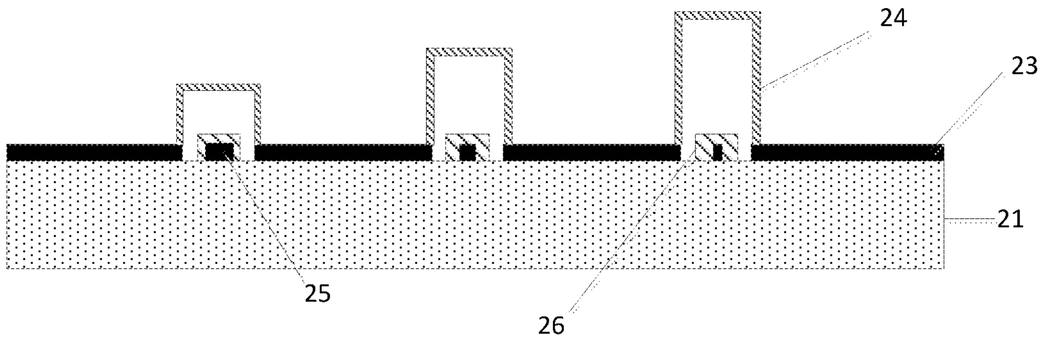
FIG. 7 is a schematic cross-sectional view showing a structure of another phase shifter according to an embodiment of the present disclosure.

Further, FIG. 7 is a schematic cross-sectional view showing a structure of still another phase shifter according to an embodiment of the present disclosure, and the present embodiment is described by taking an example of a three-bit phase shifter. As shown in FIG. 7, the phase shifter according to the present embodiment includes three phase shifting units. The metal respective film bridges 24 in the three phase shifting units in the present embodiment have a same dimension in the second direction, while the respective connection electrodes 25 therein have dimensions in the first direction that are decreased sequentially. Further, the distances between the metal respective film bridges 24 and the respective connection electrodes 25 in the phase shifting units are increased in sequence, while other structures of each phase shifting unit shown in FIG. 7 are the same as those of the phase shifting unit shown in each of FIGS. 2, 3 and 4. It can be seen from formula $$Vp = \sqrt{\frac{2k}{\varepsilon owW} g^2 (go - g)}$$

of the driving voltage Vp for the metal respective film bridge 24 that, the driving voltage Vp for the metal respective film bridge 24 is in reverse proportion to the overlapping area w*W between the metal respective film bridge 24 and the respective connection electrode 25, and is in direct proportion to the actual distance g between the metal respective film bridge 24 and the respective connection electrode 25. That is, the smaller the overlapping area w*W between the metal respective film bridge 24 and the respective connection electrode 25 is and the larger the distance between the metal respective film bridge 24 and the respective connection electrode 25 is, the required driving voltage is greater. In the present embodiment, the overlapping areas between the metal respective film bridges 24 and the respective connection electrodes 25 in different phase shifting units are set to be decreased sequentially and the distances between the metal respective film bridges 24 and the respective connection electrodes 25 in different phase shifting units are set to be increased sequentially, such that the driving voltages for the metal respective film bridges 24 can be increased gradually. Therefore, during the operation of the phase shifter, as the amplitude of the bias signal input to the signal line is increased gradually, the three phase shifting units are turned off sequentially, thereby achieving different phase shifting amounts. In the present embodiment, different phase shifting amounts can be obtained only by adjusting the magnitude of the amplitude of the bias signal on the signal line.

In some embodiments, the first reference electrode, the second reference electrode, the respective connection electrode, and the transmission line may be disposed in a same layer and are made of a same material (e.g., copper, aluminum, silver, or gold). In the present embodiment, during a manufacturing process of the phase shifter, the first reference electrode, the second reference electrode, the respective connection electrode and the transmission line can be simultaneously formed through one patterning process, thereby reducing steps of the process and the production cost.

In some embodiments, the first reference electrode, the second reference electrode, and the respective connection electrode have a one-piece structure. In the present embodiment, in the manufacturing process of the phase shifter, the first reference electrode, the second reference electrode and the respective connection electrode are formed through one patterning process, thereby further reducing steps for connecting the respective connection electrode with the reference electrodes and the production cost.

In a second aspect, embodiments of the present disclosure provide an antenna device, which includes the phase shifter as described in any one of the embodiments of FIGS. 2 to 7.

In a third aspect, embodiments of the present disclosure provide a method for manufacturing the phase shifter. Referring to FIGS. 1 to 7, the method may include the following steps.

The substrate is prepared. For example, the substrate may be a glass substrate, a ceramic substrate, a quartz substrate, or the like.

The transmission line is disposed on the substrate such that the transmission line extends in the first direction, and the first reference electrode and the second reference electrode are disposed on both sides of the extension direction (i.e., the lengthwise direction) of the transmission line.

The transmission line is formed to include the plurality of signal line segments arranged side by side and spaced apart from each other in the first direction, each of the plurality of signal line segments extends in the first direction, and a connection region is defined by a gap between any adjacent two of the plurality of signal line segments.

At least one phase shifting unit is further formed in the phase shifter, and each phase shifting unit includes: the respective film bridge extending in the first direction, the respective connection electrode extending in the second direction, and the interlayer insulating layer disposed on the side of the respective connection electrode distal to the substrate.

Both ends of the respective connection electrode are connected with the first reference electrode and the second reference electrode, respectively, and the orthogonal projection of the respective connection electrode on the substrate is located within the connection region.

Both ends of the respective film bridge are respectively connected with the adjacent two signal line segments that define the connection region.

The respective connection electrode in each phase shifting unit is positioned in a space formed by the respective film bridge and the substrate.

Further, the method may further include steps for forming other components as shown in any one of FIGS. 1 to 7.

The foregoing embodiments of the present disclosure may be combined with each other in a case of no explicit conflict.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A phase shifter, comprising:

a substrate, a transmission line on the substrate and extending in a first direction, and a first reference electrode and a second reference electrode respectively on both sides of the transmission line and extending in the first direction, wherein the transmission line comprises a plurality of signal line segments which are arranged side by side and spaced apart from each other in the first direction, each of the plurality of signal line segments extends in the first direction, and a connection region is defined by a respective gap between any adjacent two of the plurality of signal line segments;

the phase shifter further comprises at least one phase shifting unit, each phase shifting unit comprises: respective film bridge extending in the first direction, a respective connection electrode extending in a second direction, and a respective interlayer insulating layer on a side of the respective connection electrode distal to the substrate;

opposite ends of the respective connection electrode are connected with the first reference electrode and the second reference electrode, respectively, and an orthogonal projection of the respective connection electrode on the substrate is in the connection region;

opposite ends of the respective film bridge are respectively connected with adjacent two signal line segments that define the connection region;

the respective connection electrode in each phase shifting unit is in a space formed by the respective film bridge and the substrate; and the at least one phase shifting unit is a plurality of phase shifting units, and distances between respective film bridges and respective connection electrodes of at least some of the plurality of phase shifting units are different from each other.

2. The phase shifter according to claim 1, wherein the at least one phase shifting unit is a plurality of phase shifting units, and a distance between the respective film bridge and the respective connection electrode in each of the plurality of phase shifting units is a constant.

3. The phase shifter according to claim 1, wherein a respective distance between any adjacent two of the plurality of signal line segments is less than a distance between the first reference electrode and the second reference electrode.

4. The phase shifter according to claim 1, wherein the distances between the respective film bridges and the respective connection electrodes in the plurality of phase shifting units are increased monotonically or decreased monotonically in the first direction.

5. The phase shifter according to claim 1, wherein the at least one phase shifting unit is a plurality of phase shifting units, and overlapping areas of orthogonal projections of respective film bridges on the substrate and orthogonal projections of respective connection electrodes on the substrate in at least some of the plurality of phase shifting units are different from each other.

6. The phase shifter according to claim 5, wherein the overlapping areas of the orthogonal projections of the respective film bridges on the substrate and the orthogonal projections of the respective connection electrodes on the substrate in the plurality of phase shifting units are decreased monotonically in the first direction.

7. The phase shifter according to claim 6, wherein the distances between the respective film bridges and the respective connection electrodes in the plurality of phase shifting units are increased monotonically in the first direction.

8. The phase shifter according to claim 5, wherein the overlapping areas of the orthogonal projections of the respective film bridges on the substrate and the orthogonal projections of the respective connection electrodes on the substrate in the plurality of phase shifting units are different from each other, dimensions in the second direction of the respective film bridges in the plurality of phase shifting units are equal to each other, and dimensions in the first direction of the respective connection electrodes in the plurality of phase shifting units are different from each other.

9. The phase shifter according to claim 1, wherein the interlayer insulating layer comprises a material of silicon nitride or polyimide.

10. The phase shifter according to claim 1, wherein the first reference electrode, the second reference electrode, the respective connection electrode, and the transmission line are in a same layer and comprise a same material.

11. The phase shifter according to claim 1, wherein the first reference electrode, the second reference electrode and the respective connection electrode have a one-piece structure.

12. The phase shifter according to claim 1, wherein the respective film bridge comprises a material of an aluminum-silicon alloy.

13. The phase shifter according to claim 1, wherein each of the plurality of signal line segments comprises a material of copper or gold.

14. An antenna device, comprising the phase shifter according to claim 1.

15. The phase shifter according to claim 1, wherein the respective film bridge and the respective interlayer insulating layer has a respective gap therebetween.

16. The phase shifter according to claim 1, wherein the first reference electrode and the second reference electrode are spaced apart from the transmission line, respectively.

17. The phase shifter according to claim 1, wherein the first reference electrode and the second reference electrode are parallel to the transmission line, respectively.

18. The phase shifter according to claim 1, wherein the first direction and the second direction are perpendicular to each other.

19. A phase shifter, comprising:

a substrate, a transmission line on the substrate and extending in a first direction, and a first reference electrode and a second reference electrode respectively on both sides of the transmission line and extending in the first direction, wherein the transmission line comprises a plurality of signal line segments which are arranged side by side and spaced apart from each other in the first direction, each of the plurality of signal line segments extends in the first direction, and a connection region is defined by a respective gap between any adjacent two of the plurality of signal line segments;

the phase shifter further comprises at least one phase shifting unit, each phase shifting unit comprises: a respective film bridge extending in the first direction, a respective connection electrode extending in a second direction, and a respective interlayer insulating layer on a side of the respective connection electrode distal to the substrate;

opposite ends of the respective connection electrode are connected with the first reference electrode and the second reference electrode, respectively, and an orthogonal projection of the respective connection electrode on the substrate is in the connection region;

opposite ends of the respective film bridge are respectively connected with adjacent two signal line segments that define the connection region;

the respective connection electrode in each phase shifting unit is in a space formed by the respective film bridge and the substrate; and the respective film bridge of the at least one phase shifting unit has a same dimension in the second direction, and the respective connection electrode of the at least one phase shifting unit has a dimension in the first direction that is increased monotonically or decreased monotonically.

20. A phase shifter, comprising:

a substrate, a transmission line on the substrate and extending in a first direction, and a first reference electrode and a second reference electrode respectively on both sides of the transmission line and extending in the first direction, wherein the transmission line comprises a plurality of signal line segments which are arranged side by side and spaced apart from each other in the first direction, each of the plurality of signal line segments extends in the first direction, and a connection region is defined by a respective gap between any adjacent two of the plurality of signal line segments;

the phase shifter further comprises at least one phase shifting unit, each phase shifting unit comprises: a respective film bridge extending in the first direction, a respective connection electrode extending in a second direction, and a respective interlayer insulating layer on a side of the respective connection electrode distal to the substrate;

opposite ends of the respective connection electrode are connected with the first reference electrode and the second reference electrode, respectively, and an orthogonal projection of the respective connection electrode on the substrate is in the connection region;

opposite ends of the respective film bridge are respectively connected with adjacent two signal line segments that define the connection region;

the respective connection electrode in each phase shifting unit is in a space formed by the respective film bridge and the substrate; and a respective distance between any adjacent two of the plurality of signal line segments is less than a distance between the first reference electrode and the second reference electrode.

* * * * *